United States Patent [19]

Tsang et al.

[11] Patent Number: 6,150,433
[45] Date of Patent: Nov. 21, 2000

[54] INK-JET INK COMPOSITIONS CONTAINING MODIFIED MACROMOLECULAR CHROMOPHORES WITH COVALENTLY ATTACHED POLYMERS

[75] Inventors: Joseph W. Tsang; John R. Moffatt, both of Corvallis, Oreg.

[73] Assignee: Hewlett-Packard Company, Palo Alto, Calif.

[21] Appl. No.: 09/127,539

[22] Filed: Jul. 31, 1998

[51] Int. Cl.$^7$ .......................... C09D 11/02; C09D 11/10
[52] U.S. Cl. ...................... 523/160; 523/161; 106/31.6
[58] Field of Search ................. 523/160, 161; 106/31.6, 31.64, 31.85, 31.89, 31.27, 31.28, 31.75, 31.77, 31.78

[56] References Cited

U.S. PATENT DOCUMENTS

| | | | |
|---|---|---|---|
| 4,381,185 | 4/1983 | Swanson et al. | 8/506 |
| 4,530,961 | 7/1985 | Nguyen et al. | 524/832 |
| 4,548,968 | 10/1985 | Jaffe | 524/88 |
| 4,597,794 | 7/1986 | Ohta et al. | 106/20 |
| 4,713,411 | 12/1987 | Kanou et al. | 524/560 |
| 4,846,893 | 7/1989 | Akasaki et al. | 106/500 |
| 5,281,261 | 1/1994 | Lin | 106/31.65 |
| 5,310,887 | 5/1994 | Moore et al. | 534/729 |
| 5,420,187 | 5/1995 | Endo et al. | 524/556 |
| 5,554,739 | 9/1996 | Belmont | 534/885 |
| 5,571,311 | 11/1996 | Belmont et al. | 106/20 R |
| 5,630,868 | 5/1997 | Belmont et al. | 106/31.75 |
| 5,672,198 | 9/1997 | Belmont | 106/20 R |
| 5,679,724 | 10/1997 | Sacripante et al. | 523/161 |
| 5,688,317 | 11/1997 | Mackay et al. | 106/476 |
| 5,747,562 | 5/1998 | Mahmud et al. | 523/215 |
| 5,795,376 | 8/1998 | Ide | 106/31.73 |
| 5,837,045 | 11/1998 | Johnson et al. | 106/31.85 |
| 5,922,118 | 7/1999 | Johnson et al. | 106/31.6 |
| 5,928,419 | 7/1999 | Uemura et al. | 106/493 |
| 5,929,134 | 7/1999 | Lent et al. | 523/161 |

FOREIGN PATENT DOCUMENTS

| | | | |
|---|---|---|---|
| 0098338A1 | 1/1984 | European Pat. Off. | C08F 292/00 |
| 0787777A1 | 8/1997 | European Pat. Off. | |
| 0802247A2 | 10/1997 | European Pat. Off. | C09D 11/00 |
| 52-66299 | 6/1977 | Japan . | |
| 54-002490 | 1/1979 | Japan . | |
| WO 96/18688 | 6/1996 | WIPO | C09C 1/56 |
| WO 96/18695 | 6/1996 | WIPO | C09D 11/00 |
| WO 96/18696 | 6/1996 | WIPO | C09D 11/02 |

*Primary Examiner*—Vasu Jagannathan
*Assistant Examiner*—Callie E. Shosho
*Attorney, Agent, or Firm*—Michael D. Jones

[57] ABSTRACT

The present invention relates to ink-jet ink compositions that comprise modified pigment particles (macromolecular chromophores) having functional groups covalently attached for water solubility and polymer chains covalently attached to the pigments. These pigmented inks have enhanced smearfastness, enhanced print quality, improved bleed control, and improved resistance to water when applied to the media. Moreover, these inks have good viscosity and surface tension. These inks are useful in ink-jet printing, including thermal ink jet printing, piezoelectric ink jet printing, and continuous ink jet printing.

18 Claims, No Drawings

INK-JET INK COMPOSITIONS CONTAINING MODIFIED MACROMOLECULAR CHROMOPHORES WITH COVALENTLY ATTACHED POLYMERS

TECHNICAL FIELD

The present invention relates to ink-jet ink compositions that comprise modified pigment particles (macromolecular chromophores) having both functional groups attached for water solubility and vinyl polymer chains covalently attached to the pigments. These pigmented inks have enhanced smearfastness, enhanced print quality, improved bleed control, and improved resistance to water when applied to the media. Moreover, these inks have good viscosity and surface tension. These inks are useful in ink-jet printing, including thermal ink jet printing, piezoelectric ink jet printing, and continuous ink jet printing.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

On operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Ink-jet inks used in thermal ink-jet printing typically comprise a colorant and a vehicle, with the vehicle often containing water and other relatively low surface tension liquids.

There are two general classifications of colorants: dye-based and pigment-based. Dyes have the advantage of being water-soluble. However, problems with dyes include poor waterfastness, poor smearfastness, poor bleed control between colors, and poor lightfastness. Pigments are generally water insoluble and require a dispersant or other means to make it soluble in water.

Although the relevant art contains many examples of ink-jet ink formulations using these colorants, a need still exists for ink compositions comprising stable, water soluble pigments which provide improved smearfastness, waterfastness, improved print quality, improved bleed control, and optical density.

DISCLOSURE OF INVENTION

In accordance with the invention, an ink-jet ink composition is provided which comprises a colorant that is both water-soluble and contains vinyl polymers covalently attached to the colorant. The colorants used herein comprise pigment particles, the surface of which are treated with functional groups to provide water solubility as well as polymers to give exceptional properties in an ink formulation. Such treated pigments are called macromolecular chromophores (MMC). Inks comprising these MMCs are very effective in reducing smear and have increased waterfastness, bleed control, optical density and improved print quality. By bleed control is defined as the invasion of one colored ink printed substantially, simultaneously and adjacently to a second colored ink. The ink may contain further components to aid in providing improved print quality and performance in an ink-jet printer.

Additionally, a method of ink-jet printing that uses the disclosed inks and exploits the inks' properties is provided.

All concentrations herein are in weight percent, unless otherwise indicated. The purity of all components is that employed in normal commercial practice for ink-jet inks. All references and cited patents are hereby incorporated by reference.

BEST MODES FOR CARRYING OUT THE INVENTION

The pigment particles, or MMCs, for use in the present ink formula comprises chemical modifications to impart water solubility to the pigment. Under typical chemical processes, the resulting surface of the MMC consists of carboxylate, phosphate, and/or sulfonate functionalities for anionic chromophores, and ammonium, quaternary ammonium, or phosphonium functionalities for cationic chromophores.

The MMC colorant particles of the present invention preferably have a useful mean diameter ranging from 0.005 to 12 um. Colorants of this type result from chemical reactions where solvent-accessible functional groups are derivatized to provide solubilizing groups that render the colorant soluble in water. The resulting macromolecular chromophore (MMC) is water-soluble, with its solubility being similar to that of well-known, commercially used water-soluble acidic and basic dyes.

These water-soluble black chromophores are made from commercially available pigments obtained from colorant vendors such as Cabot Corp. and Orient Chemical. Many pigments are useful in the practice of this invention. The following pigments comprise a partial list of useful colorants in this invention.

Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140, are all available from BASF Corp.

The following pigments are available from Cabot: Monarch® 1400, Monarch® 1300, Monarch® 1100, Monarch® 1000, Monarch® 900, Monarch® 880, Monarch® 800, and Monarch® 700.

The following pigments are available from Ciga-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Maroon B.

The following pigments are available from Columbian: Raven 7000, Raven 5750, Raven 5250, Raven 5000, and Raven 3500. The following pigments are available from Degussa: Color Back FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from Dupont. The following pigments are available from Heubach: Dalamar® Yellow YT-858-D and Heucophthal® Blue G XBT 583D. The following pigments are available from Hoechst: Permanent Yellow GR, Permanent Yellow G, Permanent Yellow NCG-71, Permanent Yellow GG, Hansa Yellow RA, Hansa Brillant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, Indofast® Violet. The following pigments are available from Sun Chem: L74-1357 Yellow, L75-1331 Yellow, and L75-2577 Yellow.

Modification imparting Water-solubility—The MMCs herein are modified by the addition of one or more organic groups comprising at least one aromatic group or a C1–C12 alkyl group and at least one ionic group or ionizable group. The ionizable group is one that forms in ionic groups in the aqueous medium. The ionic group may be anionic or cationic. The aromatic groups may be further substituted or unsubstituted. Examples include phenyl or a naphthyl groups and the ionic group is sulfonic acid, sulfinic acid, phosphonic acid, carboxylic acid, ammonium, quaternary ammonium, or phosphonium group.

Depending on the process selected, the MMC can either be anionic or cationic in character. As commercially available, the anionic chromophores are usually associated with sodium or potassium cations, and the cation chromophores are usually associated with chloride or sulfate anions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid and metanilic acid.

Ammonium, quaternary ammonium groups, quaternary phosphonium groups, and protonated amine groups represent examples of cationic groups that can be attached to the same organic groups discussed above.

See U.S. Pat. Nos. 5,707,432; 5,630,868; 5,571,311; and 5,554,739 for a discussion of modified carbon black pigments and methods of attaching the functionalized groups.

Second Modification: Adding Polyolefinic Groups to MMCs—After modification by the addition of water-soluble functional groups, the MMCs are further modified by subsequent reactions which result in covalently attaching polymerizable polyolefinic groups, preferably any alkylene group, to the MMC. Suitable polyolefinic groups have the following structure covalently attached to the surface of the MMC:

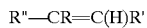

wherein R can be H or methyl, R' can be H or an alkyl or aryl having from about 1 to about 10 carbons and R" can be any alkyl, alkenyl, aryl groups having from about 1 to 20 carbons and optionally heteroatoms, preferably N and O. Preferred examples of these groups include vinyl, acrylate, acrylamide, methacrylate, and methacrylamide. They may be present in any ratio.

Examples of suitable functional groups which act as the starting point for polymerization on the MMC include:

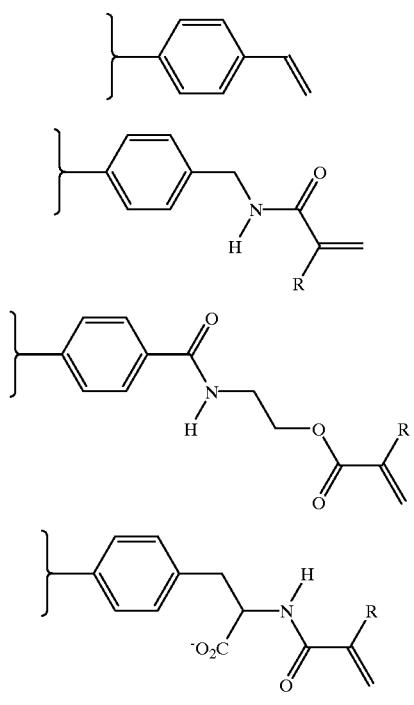

R = CH₃, H

The MMC disclosed and claimed herein may comprise from about 0.001 to about 10 mmole/g total of covalently attached water solubilizing groups and covalently attached polymer. (The polymer is covalently attached through one or the vinyl, (meth) acrylates, or styryl groups shown above). The covalently attached polymeric composition consists of one or more monomers (shown below) in any relative proportion.

Polymer Attachment—Use of the above chromophores which already have the functional groups covalently attached to the MMC allows for the polymer reaction to take place in water. The placement of the vinyl, acrylate, methacrylate, acrylamide, or methacrylamide group(s) on the MMC allows for the attachment of the polymer at specific sites rather than nonspecific absorption onto the MMC surface. Suitably polymerization processes for use in this invention include solution, emulsion, or suspension methods. The radical chain polymerization occurs on the functionalized MMC surface to form a variety of polyacrylates, polymethacrylates, and other homo- or co-polymers. Thus, the polymers are covalently attached to the MMC, not merely associated with the colorant particle by van der Waals or London dispersion forces. Thus, unlike typical pigment-based inks, the ink formulations herein are substantially free (less than 0.005 wt %) of traditional dispersants which provide water-solubility by noncovalently bonding or otherwise associating with the colorant particle.

Suitable monomers which can be used in the polymerization process include esters of C50 or less of acrylic and methacrylic acids; amides of C50 or less of acrylic and methacrylic acids; alkylene glycols and their ethers of acrylic and methacrylic acids; vinyl pyrrolidone, vinyl carbazole, vinyl acetate and alcohols, allyl acetate, and all isomers of amino and sulfonic acides of styrene. The polymerization process usually continues until no free monomers are observed in the reaction mixture. A person skilled in the art will recognize that this observation can usually be conducted by gas chromatography methods. The wt average molecular weight of the polymers used herein is from about 300 to about 100,000, preferably from about 5,000 to about 30,000. The MW of the polymer is determined from the MW of the free polymer polymerized in the absence of the MMC. It is assumed that the MW of the free polymers is the same as when attached to the MMC.

One or more of the following monomers may be added in any combination and in any ratio.

Structures of suitable vinyl monomers are listed below.

Acrylic and methacrylic acids, and the salt form
R = (acrylic acid) or CH3 (methacrylic acid)

Esters of acrylic and methacrylic acids
$R_1$ = H (acrylic acid) or CH3 (methacrylic acid)
$R_2$ = radical of 1–50 carbon Amides of acrylic acid
$R_1$ = H (acrylic acid) or CH3 (methacrylic acid)
$R_2$ and $R_3$ = H or radical of 1–50 carbon Hydroxy amides of acrylic and methacrylic acids
$R_1$ = H (acrylic acid) or CH3 (methacrylic acid)
$R_2$ = radical of 1–50 carbon Polyethylene glycols and ethers of acrylic acid
$R_1$ = H (acrylic acid) or CH3 (methacrylic acid)
$R_2$ = H or radical of 1–50 carbon
$n$ = 1–100 repeat units Polyalkylene glycols and ethers of acrylic acid
$R_1$ = H (acrylic acid) or CH3 (methacrylic acid)
$R_2$ = radical of 1–50 carbon
$R_3$ = H or radical of 1–50 carbon
$n$ = 1–100 repeat units Sulfoalkyl(aryl) acrylate and methacrylate, and their salt form
$R_1$ = H (acrylate) or CH3 (methacrylate)
$R_2$ = radical of 1–50 carbon Stryene and its derivates
X and Y = H, $NH_2$, $SO_3H$, $OCH_3$ or radical of 1–20 carbon Vinyl ether
R = radical of 1–50 carbon Diallyldialkyl ammonim halide
$R_1$ and $R_2$ = H or 1–20 carbon
$X^-$ = $F^-$, $Cl^-$, $Br^-$, $I^-$, $SO_4^{2-}$, $PO_4^{3-}$ Vinyl sulfonic acid and the salt form N-Vinylamides
$R_1$ = H or radical of 1–20 carbon
$R_2$ = H (foramide) or radical of 1–50 carbon (acetamide)

Allyl methacrylate

Allyl acrylamide

N-vinylcarbazole

N-vinyl pyrrolidone

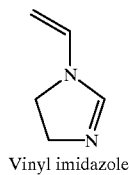

Vinyl imidazole

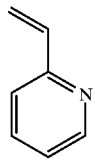

Vinyl pyridine

The polymers herein may optionally comprise copolymers of unsaturated compounds with vinyl monomers such as acrylates and methacrylates. These compound may display surface active properties. Examples are listed below.

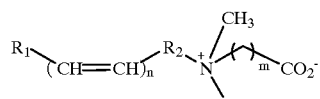

polyunsaturated betaines

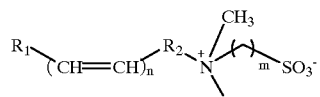

polyunsaturated sulfo-betaines

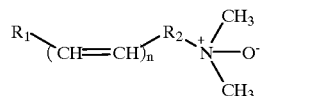

polyunsaturated amine oxides

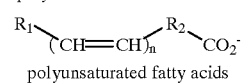

polyunsaturated fatty acids

R1 and R2 = radical of 1–50 carbon
m and n = 1–10 repeat unit

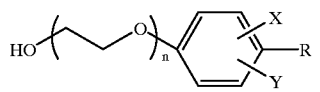

polyethylene oxide alkyl alkyenyl phenol

X, Y = H or ——CH═CH$_2$
R = radical of 1–50 carbon
n = 1–100 repeat units

To improve the mechanical property of the polymers, optional crosslinking monomers may be included in the polymer chains. Examples of di- and polyfunctional vinyl monomers are showed below.

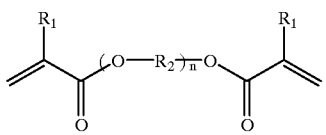

Polyalkylene (aryl) glycol diacrylates and dimethacrylates $R_1$ = H (acrylate) or CH$_3$ (methacrylate)
$R_2$ = 1–20 carbon
n = 1–50 repeat units

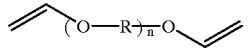

Polyalkylene (aryl) divinyl ethers

R = 1–20 carbon
n = 1–50 repeat units

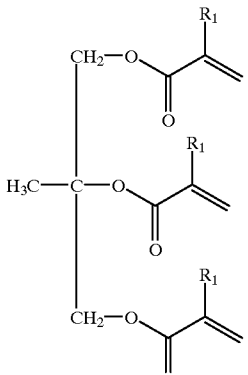

Trimethylolpropane triacrylates and trimethacrylates

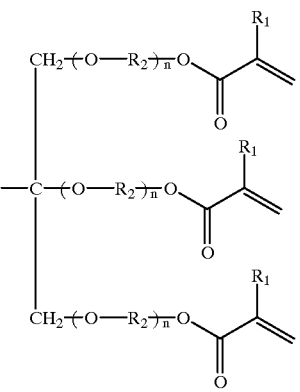

Alkoxylated trimethylolpropane triacrylate and trimethacrylate

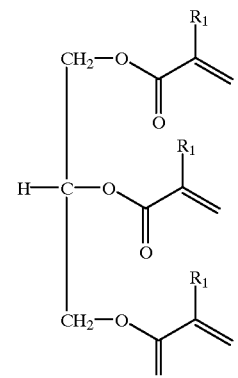

Glyceryl triacrylates and trimethacrylates

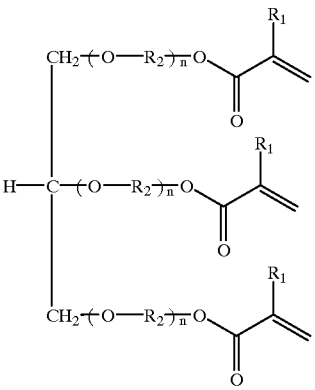

Alkoxylated glyceryl triacrylate and trimethacrylate
$R_1$ = H (acrylate) or $CH_3$ (methacrylate)
$R_2$ = radical of 1–50 carbon
$n$ = 1–50 repeat units

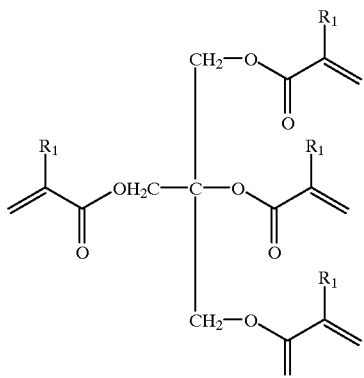

Pentaerythritol tetraacrylate and tetramethacrylate

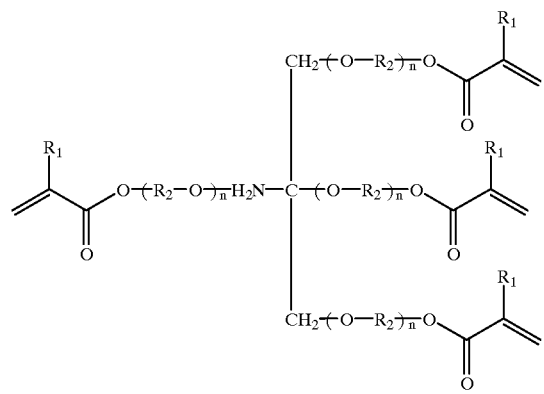

Alkoxylated pentaerythritol tetraacrylate and tetramethacrylate
$R_1$ = H (acrylate) or $CH_3$ (methacrylate)
$R_2$ = 1–50 carbon
$n$ = 1–50 repeat units Examples of preferred vinyl monomers for use herein include the following:

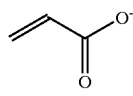
Acrylic acid, $Na^+$ and $K^+$ salt

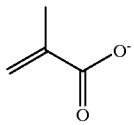
Methacrylic acid, $Na^+$ and $K^+$ salt

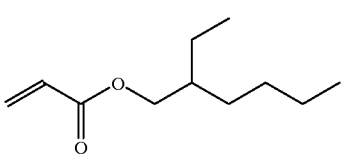
2-Ethyl hexyl acrylate

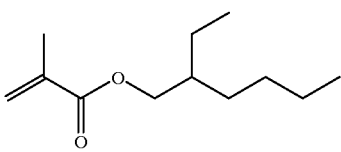
2-Ethyl hexyl methacrylate

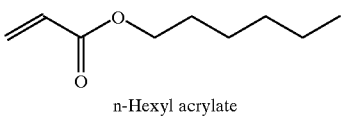
n-Hexyl acrylate

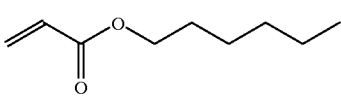
n-Hexyl methacrylate

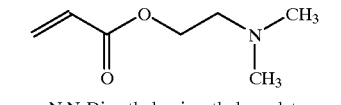
N,N-Dimethylaminoethyl acrylate

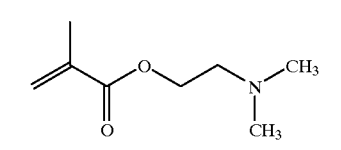
N,N-Dimethylaminoethyl methacrylate

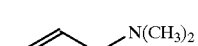   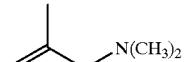
N,N-dimethylamino acrylamide    N,N-dimethylamino methacrylamide

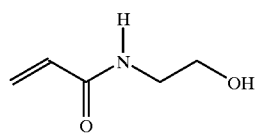   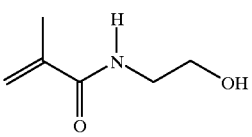
N-Hydroxyethyl acrylate    N-Hydroxyethyl methacrylate

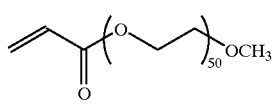
Polyethylene glycol 2000 monomethyl ether acrylate

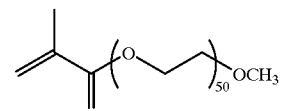
Polyethylene glycol 2000 monomethyl ether methacrylate

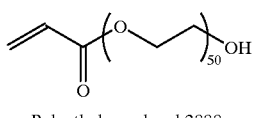
Polyethylene glycol 2000 acrylate

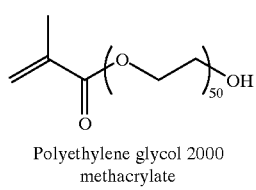
Polyethylene glycol 2000 methacrylate

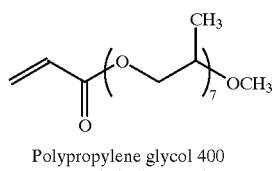
Polypropylene glycol 400 monomethyl ether acrylate

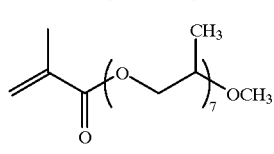
Polypropylene glycol 400 monomethyl ether methacrylate

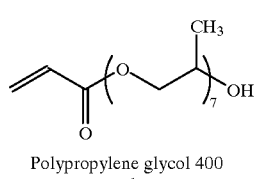
Polypropylene glycol 400 acrylate

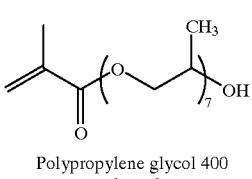
Polypropylene glycol 400 methacrylate

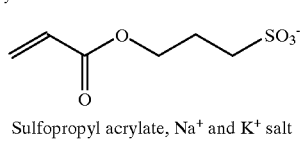
Sulfopropyl acrylate, Na⁺ and K⁺ salt

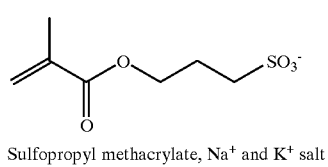
Sulfopropyl methacrylate, Na⁺ and K⁺ salt

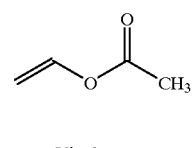
Vinyl acetate

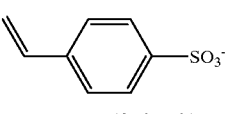
4-Stryene sulfonic acid, Na⁺ and K⁺ salt

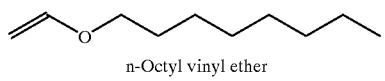
n-Octyl vinyl ether

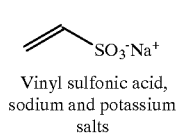
Vinyl sulfonic acid, sodium and potassium salts

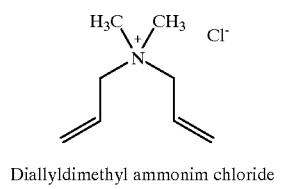
Diallyldimethyl ammonim chloride

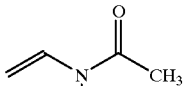
N-Vinylacetamide

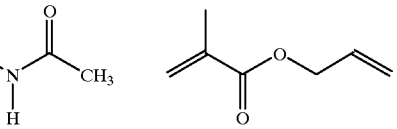
Allyl methacrylate

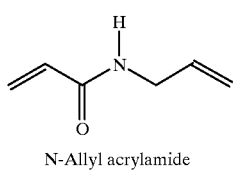
N-Allyl acrylamide

N-vinyl pyrrolidone

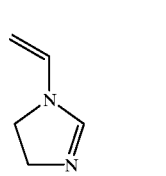
Vinyl imidazole

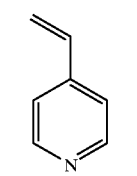
4-Vinyl pyridine

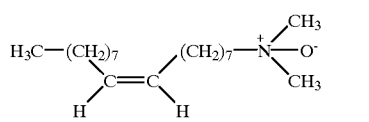
N, N-dimethyl-N-(Z-9-octadecnyl)-N-amine oxides

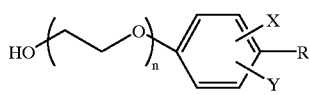
X, Y = H or —CH=CH₂
R = radical of 1–50 carbon
n = 1–100 repeat units Noigen RN-10, Noigen RN-20, and Hitenol BC-10 (Daichi Kogyo Seiyaku)

Examples of preferred vinyl monomers for crosslinking include the following:

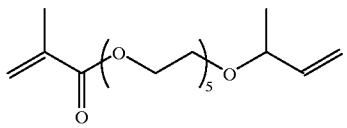
Polyethylene glycol 200 dimethacrylates

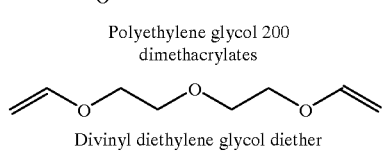
Divinyl diethylene glycol diether

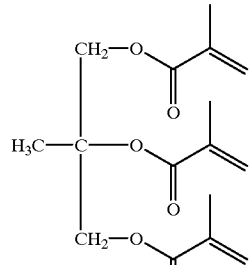
Trimethylolpropane trimethacrylates

-continued

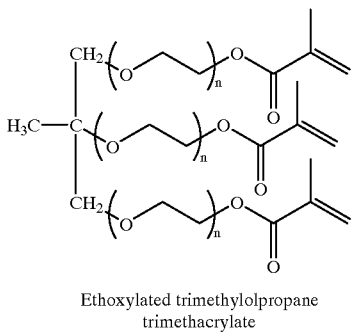

Ethoxylated trimethylolpropane
trimethacrylate

It should be noted in the structures above that the various carbon chains can refer to saturated or unsaturated hydrocarbons with or without aromatic moieties. Further, a person skilled in the art would recognize that the optimal ratio of a specific monomer, in particular the monomers capable of crosslinking, may affect the performance of the inkjet ink formulations. For instance, use of high levels of the crosslinking monomers may result in gelling of the MMC.

Ink-jet Ink Vehicle—The ink compositions of this invention comprise the modified MMC colorants above plus a vehicle. For a discussion of inks and their properties, see *The Printing Manual, 5$^{th}$* ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes the MMC (about 0.001% to 10 wt %), one or more cosolvents (0.01 to about 50 wt %), one or more water-soluble surfactants/amphiphiles (0 to about 40, preferably about 0.1 to about 5 wt %), one or more high molecular weight colloids (0 to about 3 wt %), and water (balance).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol)ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from about 0.01 to about 50 wt %, with about 0.1 to 15 wt % being preferred.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols. Ionic surfactants such as substituted amine oxides are useful in the practice of this invention. U.S. Pat. No. 5,106,416, disclosed more fully most of the surfactants listed above. The non-ionic amphiphiles/surfactants are more preferred than the ionic surfactants. Specific examples of amphiphilies/surfactants that are preferably employed in the practice of this invention include iso-hexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %.

To further improve optical density, between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from about 0.1% to about 0.75 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the MMC colorants disclosed herein. For ink formulation which employee MMCs having carboxylate functionalities, the pH is from about 7 to about 12. For sulfonate or cationic functionalities, the pH ranges from about 3 to about 12, preferably the pH is from about 5 to about 9. The viscosity of the final ink composition is from about 0.8 to about 8 cps, preferably from about 0.9 to about 4 cps.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

EXAMPLES

The MMCs of the present invention are typically prepared in two steps: 1) covalent attachment of the water-solubilizing group on commercially available carbon black pigments and 2) covalent attachment of vinyl-containing functional groups. During the synthesis of the MMCs, mixing under high shear maximizes the mixing efficiency. Examples of suitable high shear mixers include attritors, homogenizers, microfluidizers, acute pressure valves, two or three roll mills, and sonicators.

Example I

To a reaction vessel is charged 11.0 g sodium nitrite, 22.0 g para-aminobenzoic acid (PABA), and 1200 g water at 0 C. Diazonium salt of PABA is formed. Monarch™ 700 carbon black, 200 g, is added to the solution, and copious amounts of nitrogen is evolved from the mixture. The reaction mixture is concentrated and dried at elevated temperature to drive the reaction further. The resulting mixture is redissolved and filtered through a membrane filter to remove unreacted carbon black to afford a crude PABA-treated MMC solution at about 15 wt %.

The diazonium salt of 4-aminostyrene is prepared as above from 3.6 g aminostyrene, 2.1 g sodium nitrite, and 150 g water. Ethanol, 10 g, is added to completely dissolve the diazonium salt. A solution of PABA-treated MMC is added to the diazonium salt solution, and it is allowed to react for 18 hours under mixing. The solution is filtered to provide MMC solution at about 11 wt %. This MMC contains both benzoic acid and styrene functionalities covalently attached to the MMC particle.

Example II

A reaction vessel is charged with 11.4 g sodium nitrite, 28.0 g sulfanilic acid (SA), and 1200 g water water at 0 C. Diazonium salt of SA is formed. Monarch™ 700 carbon black, 200 g, is added to the solution, and copious amounts of nitrogen is evolved from the mixture. The reaction mixture is concentrated and dried at elevated temperature to drive the reaction further. The resulting mixture is redissolved and filtered through a membrane filter to remove unreacted carbon black to afford a crude SA-treated MMC solution at about 15 wt %.

The diazonium salt of 4-aminostyrene is prepared as described above from 3.6 g aminostyrene, 2.1 g sodium nitrite, and 150 g water. Ethanol, 10 g, is added to completely dissolve the diazonium salt. A solution of SA-treated MMC is added to the diazonium salt solution, and it is allowed to react for 18 hours under mixing. The solution is filtered to provide MMC solution at about 11 wt %. This MMC contains both benzenesulfonic acid and styrene functionalities covalently attached to the MMC particle.

Example III

A reaction vessel is charged with 11.4 g sodium nitrite, 28.0 g sulfanilic acid (SA), and 1200 g water at 0 C. Diazonium salt of SA is formed. Monarch™ 700 carbon black, 200 g, is added to the solution, and copious amounts of nitrogen is evolved from the mixture. The reaction mixture is concentrated and dried at elevated temperature to drive the reaction further. The resulting mixture is soxhlet extracted for 12 hours with ethanol to remove starting materials and reaction by-products. It is then redissolved in water and filtered to yield a sulfanilic acid-treated MMC solution at about 20 wt %.

The diazonium salt of 4-aminostyrene is prepared as above from 3.6 g aminostyrene, 2.1 g sodium nitrite, and 150 g water. Ethanol, 10 g, is added to completely dissolve the diazonium salt. A solution of SA-treated MMC is added to the diazonium salt solution, and it is allowed to react for 18 hours under mixing. The solution is filtered to provide MMC solution at about 11 wt %. This MMC contains both benzenesulfonic acid and styrene functionalities covalently attached to the MMC particle. Purification through soxhlet extraction enable higher levels of 4-aminostyrene to be added to the MMC surface.

Example IV

50/50 wt %/wt % MMC/polymer (40/40/20 MMA/HA/PEG200-OMeAA)—In a reaction vessel, 30 g of deionized water is degassed at 90 C under nitrogen atmosphere. A mixture of 28.13 g MMC solution (Example III, above), 2.0 g of methyl methacrylate, 2.0 g of hexyl acrylate, 1.0 g of polyethylene glycol 2000 monomethyl ether acrylate in 3.0 g deionized water is added dropwise over 20 minutes. Potassium persulfate, 0.22 g, is added at once. The reaction is maintained at 80 C for 18 hours where it remains homogenous. The mixture is concentrated under reduced pressure, and soxhlet extracted with acetone to remove unattached polymer. Small amounts of polymer is found (<3 wt %) in acetone extract. The remaining polymer is polymerized with styrene groups on the MMC surface.

The purified material is redissolved in deionized water to provide a 10 wt % solution.

Example V–X

| | | | Example V-X | | | |
|---|---|---|---|---|---|---|
| Example | Hydrophilic Monomer | Hydrophobic Monomer | Polymer Composition (wt %) | Polymer/MMC (wt %) | Initiator | Chain Transfer Agent (1) |
| V | PEG200-OmeAA | MMA, HA | 40/40/20 | 50/50 | $K_2S_2O_8$ | — |
| VI | PEG200-OmeAA | MMA, HA | 40/40/20 | 50/50 | $K_2S_2O_8$ | OMP |
| VII | Sodium Methacrylate | Benzyl Methacrylate | 70/30 | 40/60 | ACVA | — |
| VIII | Sodium Methacrylate | Benzyl Methacrylate | 50/50 | 40/60 | AMPA | — |

-continued

Example V-X

| Example | Hydrophilic Monomer | Hydrophobic Monomer | Polymer Composition (wt %) | Polymer/MMC (wt %) | Initiator | Chain Transfer Agent (1) |
|---|---|---|---|---|---|---|
| IX | Sodium Methacrylate | — | 100 | 40/60 | ACVA | — |
| X | Sodium Methacrylate | — | 100 | 40/60 | Vazo 88 | — |

Monomers:
PEG200-OMe AA = polyethylene glycol 2000 monomethyl ether acrylate;
MMA = methyl methacrylate;
HA = hexyl acrylate
Initiators
$K_2S_2O_8$ = potassium persulfate;
ACVA = 4,4-azobis(4-cyanovaleric acid);
Vazo 88 = Azobis(cyclohexanecarbonitrile);
AMTA = 2,2-azobis(2-methylpropionamidine)dihydrochloride Chain transfer agent: ONV=Iso-octyl mercaptopropionate Stability study (a) A 3 wt % solution in deionized water is subjected to 60 C for 1 week. In all cases, no gross sedimentation is visually observed on the bottom of test tube. The solution is further analyzed for aggregation by light scattering. Particle size results are listed below.

| Sample | Initial | 1 week at 60 C. later |
|---|---|---|
| Example V | 142 nm | 150 nm |
| Example VI | 142 nm | 158 nm |

(b) Over 3 months at room temperature, no change in particle size or any indication of settling is observed. Particle size results are listed below.

| Sample | Initial | 3 months later |
|---|---|---|
| Example V | 142 nm | 140 nm |
| Example VI | 142 nm | 151 nm |
| Example IX | 138 nm | 133 nm |
| Example X | 148 nm | 155 nm |

INDUSTRIAL APPLICABILITY

The inclusion of the modified MMCs described above is expected to find use in inks employed in ink-jet printing.

What is claimed is:

1. An ink-jet ink composition comprising a macromolecular chromophore, said macromolecular chromophore comprises:

a) at least one water-solublizing functional group; and b) at least one covalently attached polymer, wherein said polymer is covalently attached to said macromolecular chromophore through a polyolefinic group having the structure:

R"—CR=C(H)R' wherein R can be H or methyl, R' can be H or an alkyl or aryl having from about 1 to about 10 carbons and R" can be any alkyl, alkenyl, aryl groups having from about 1 to 20 carbons and, optionally, heteroatoms; and wherein said polymer is obtained from monomers selected from the group consisting of:

Amides of acrylic acid

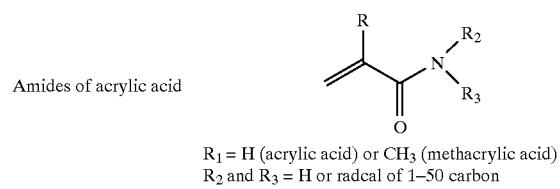

$R_1$ = H (acrylic acid) or $CH_3$ (methacrylic acid)
$R_2$ and $R_3$ = H or radcal of 1–50 carbon Hydroxy amides of acrylic and methacrylic acids

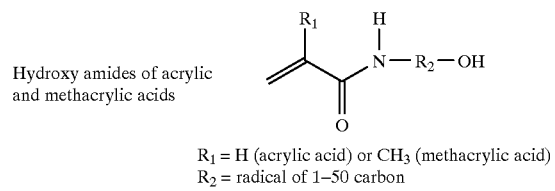

$R_1$ = H (acrylic acid) or $CH_3$ (methacrylic acid)
$R_2$ = radical of 1–50 carbon Polyethylene glycols and ethers of acrylic acid

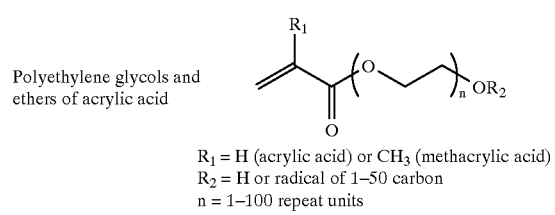

$R_1$ = H (acrylic acid) or $CH_3$ (methacrylic acid)
$R_2$ = H or radical of 1–50 carbon
n = 1–100 repeat units Polyalkylene glycols and ethers of acrylic acid

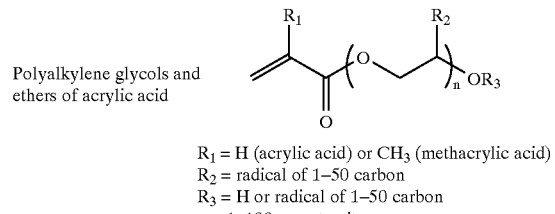

$R_1$ = H (acrylic acid) or $CH_3$ (methacrylic acid)
$R_2$ = radical of 1–50 carbon
$R_3$ = H or radical of 1–50 carbon
n = 1–100 repeat units Sulfoalkyl(aryl) acrylate and methacrylate, and their salt form

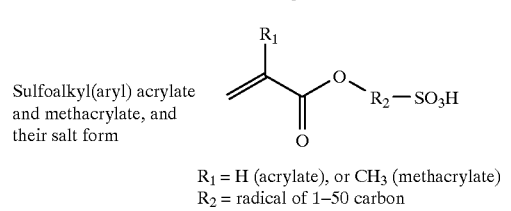

$R_1$ = H (acrylate), or $CH_3$ (methacrylate)
$R_2$ = radical of 1–50 carbon

Stryene and its derivates

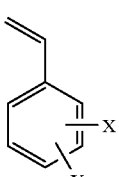

X and Y = H, NH$_2$, SO$_3$H, OCH$_3$ or radical of 1–20 carbon

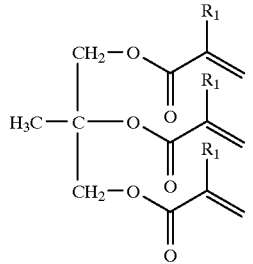

Trimethylolpropane triacrylates and trimethacrylates

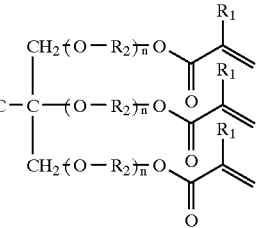

Alkoxylated trimethylolpropane triacrylate and trimethacrylate

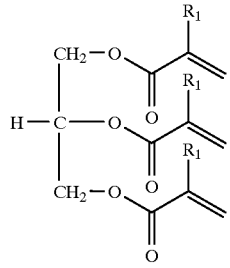

Glyceryl triacrylates and trimethacrylates

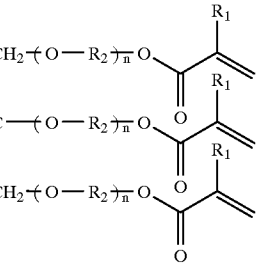

Alkoxylated glyceryl triacrylate and trimethacrylate

R$_1$ = H (acrylate) or CH$_3$ (methacrylate)
R$_2$ = radical of 1–50 carbon
n = 1–50 repeat units

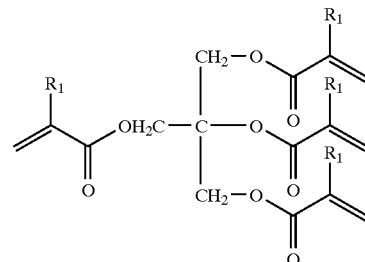

Pentaerythritol tetraacrylate and tetramethacrylate

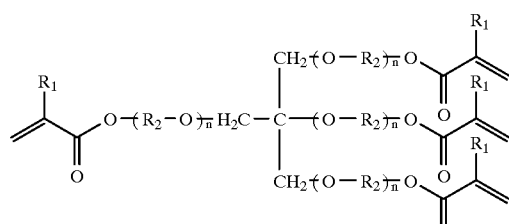

Alkoxylated pentaerythritol tetraacrylate and tetramethacrylate

R$_1$ = H (acrylate) or CH$_3$ (methacrylate)
R$_2$ = 1–50 carbon
n = 1–50 repeat units

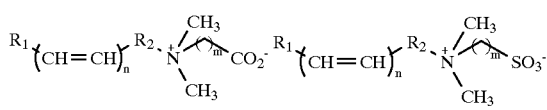

polyunsaturated betaines          polyunsaturated sulfo-betaines

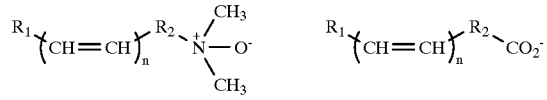

polyunsaturated amine oxides      polyunsaturated fatty acids

R1 and R2 = radical of 1–50 carbon
m and n = 1–10 repeat unit

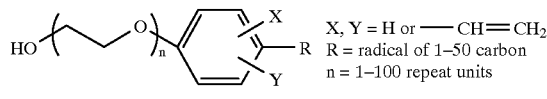

polyethylene oxide alkyl alkyenyl phenol

X, Y = H or —CH=CH$_2$
R = radical of 1–50 carbon
n = 1–100 repeat units

Polyalkylene (aryl) glycol diacrylates and dimethacrylates

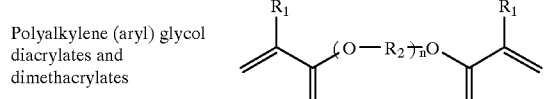

R$_1$ = H (acrylate) or CH$_3$ (methacrylate)
R$_2$ = 1–20 carbon
n = 1–50 repeat units Polyalkylene (aryl) divinyl ethers

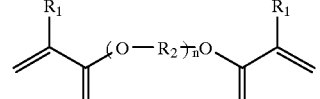

R = 1–20 carbon
n = 1–50 repeat units

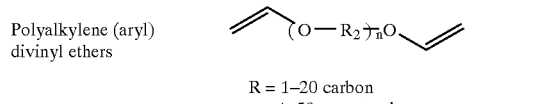

Polyethylene glycol 200 dimethacrylates          Divinyl diethylene glycol diether

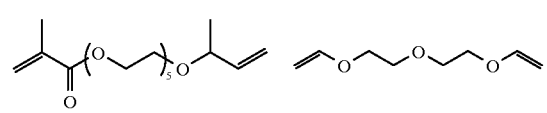

Acrylic acid, Na$^+$ and K$^+$ salt        Methacrylic acid, Na$^+$ and K$^+$ salt

2-Ethyl hexyl acrylate            2-Ethyl hexyl methacrylate

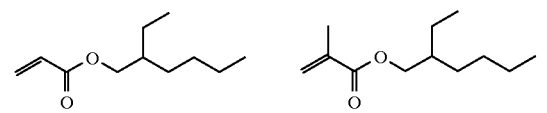

n-Hexyl acrylate                  n-Hexyl methacrylate

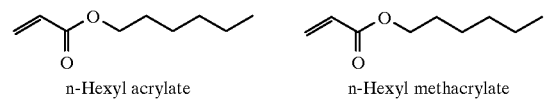

N,N-Dimethylaminoethyl acrylate    N,N-Dimethylaminoethyl methacrylate

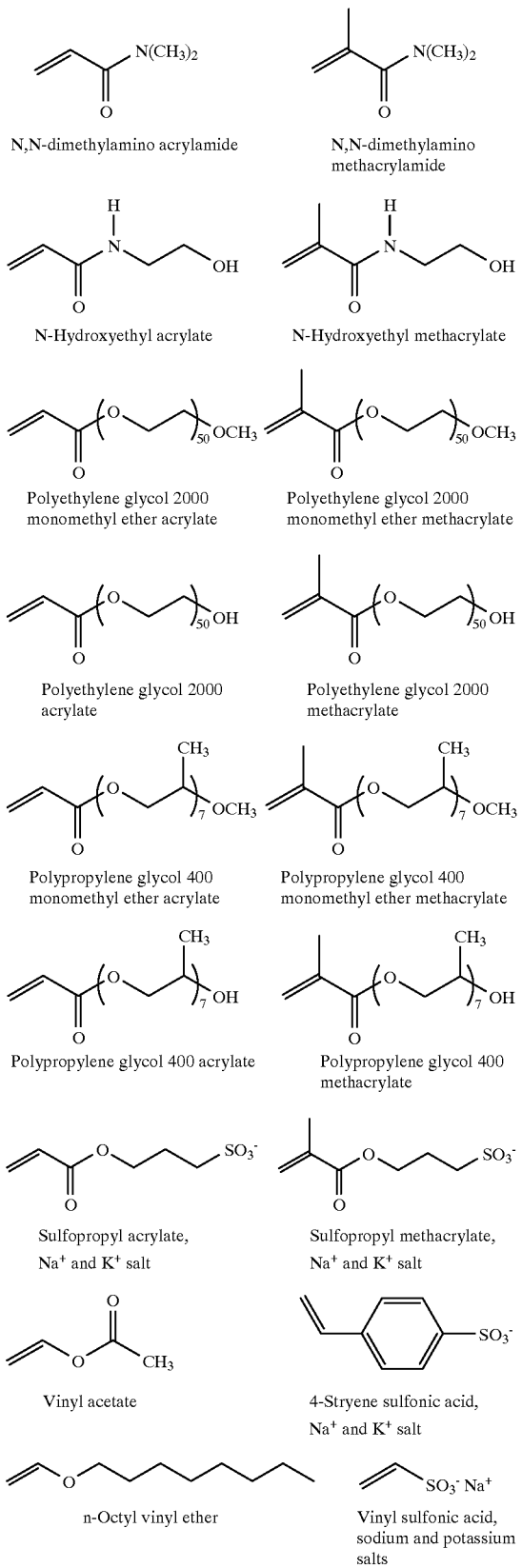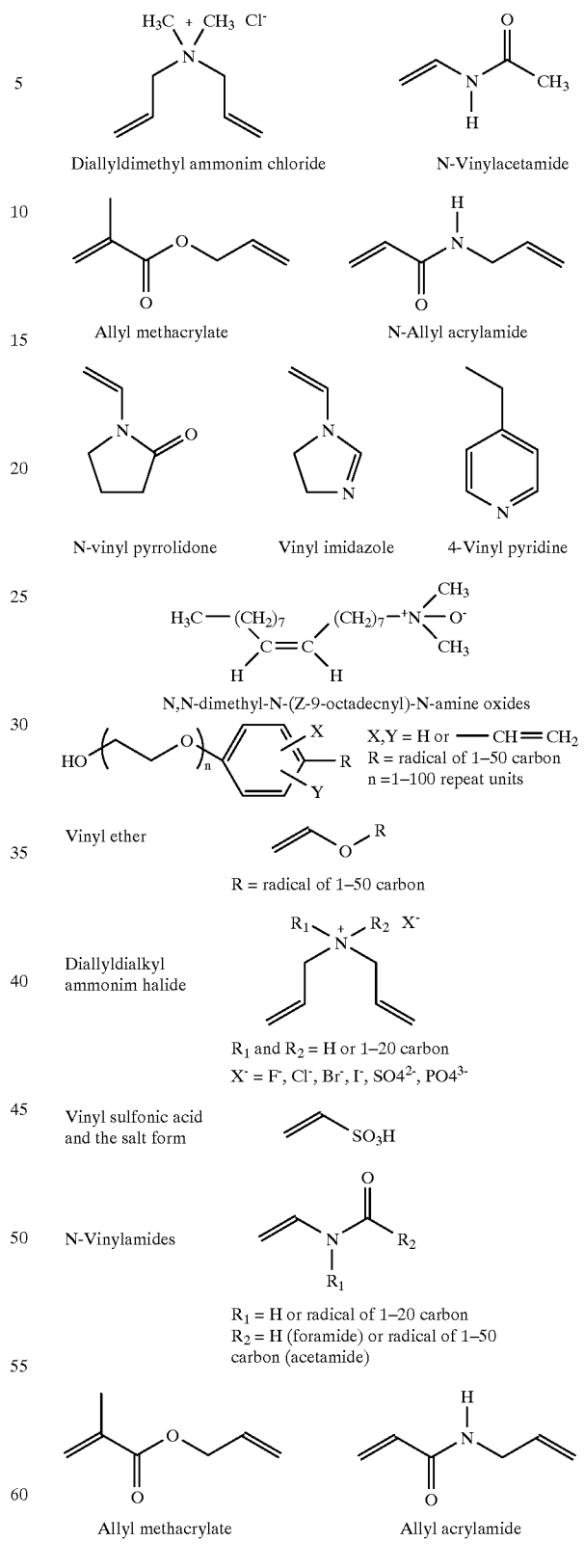

-continued

N-vinylcarbazole

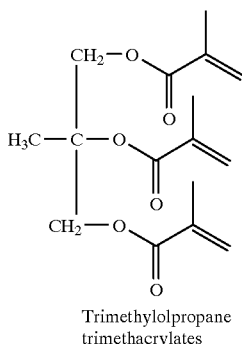

Trimethylolpropane trimethacrylates

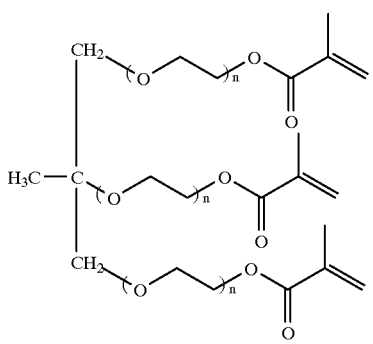

Ethoxylated trimethylolpropane trimethacrylate and mixtures thereof.

2. An ink composition according to claim 1 wherein said water-solubilizing functional groups are aromatic groups having attached ionizable groups selected from the group consisting carboxylate, sulfonate, ammonium, quaternary ammonium, phosphonium, and mixtures thereof.

3. An ink composition according to claim 1 wherein said water-soluble functional groups and said polyolefinic groups comprise from about 0.001 mmol/g to about 10 mmol/g of said macromolecular chromophore.

4. An ink composition according to claim 1 wherein said polyolefinic group is selected from the group consisting vinyl, acrylate, methacrylate, acrylamide, methacrylamide, and mixture thereof.

5. An ink composition for use in ink-jet printing according to claim 1 comprising:
   a) from about 0.001% to about 10 wt % of said macromolecular chromophore;
   b) from about 0.01% to about 50 wt % of one or more cosolvents;
   c) from 0% to about 40 wt % of one or more water-soluble surfactants/amphiphiles; and
   d) from 0% to about 3 wt % of one or more high molecular weight colloid.

6. An ink composition according to claim 5 wherein said water-solubilizing functional groups are aromatic groups having attached ionizable groups selected from the group consisting carboxylate, sulfonate, ammonium, quaternary ammonium, phosphonium, and mixtures thereof.

7. An ink composition according to claim 5 wherein said water-soluble functional groups and said polyolefinic groups comprise from about 0.001 mmol/g to about 10 mmol/g of said macromolecular chromophore.

8. An ink composition according to claim 5 wherein said polyolefinic group is selected from the group consisting vinyl, acrylate, methacrylate, acrylamide, methacrylamide, and mixture thereof.

9. An ink composition according to claim 5 wherein said ink composition has a pH of from about 8 to about 10.

10. A method of ink-jet printing comprising printing on a medium an ink-jet ink composition comprising a macromolecular chromophore, wherein said macromolecular chromophore comprises:
   a) at least one water-solublizing functional group; and
   b) at least one covalently attached polymer, wherein said polymer is covalently attached to said macromolecular chromophore through a polyolefinic group having the structure:

R"—CR=C(H)R' wherein R can be H or methyl, R' can be H or an alkyl or aryl having from about 1 to about 10 carbons and R" can be any alkyl, alkenyl, aryl groups having from about 1 to 20 carbons and, optionally, heteroatoms; and wherein said polymer is obtained from monomers selected from the group consisting of:

Amides of acrylic acid

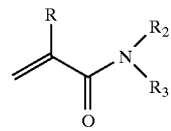

$R_1$ = H (acrylic acid) or $CH_3$ (methacrylic acid)
$R_2$ and $R_3$ = H or radcal of 1–50 carbon Hydroxy amides of acrylic and methacrylic acids

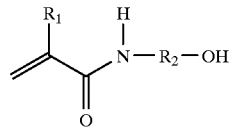

$R_1$ = H (acrylic acid) or $CH_3$ (methacrylic acid)
$R_2$ = radical of 1–50 carbon Polyethylene glycols and ethers of acrylic acid

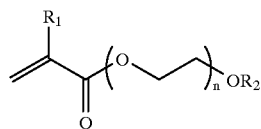

$R_1$ = H (acrylic acid) or $CH_3$ (methacrylic acid)
$R_2$ = H or radical of 1–50 carbon
n = 1–100 repeat units Polyalkylene glycols and ethers of acrylic acid

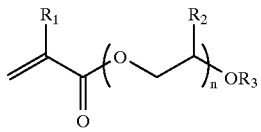

$R_1$ = H (acrylic acid) or $CH_3$ (methacrylic acid)
$R_2$ = radical of 1–50 carbon
$R_3$ = H or radical of 1–50 carbon
n = 1–100 repeat units Sulfoalkyl(aryl) acrylate and methacrylate, and their salt form

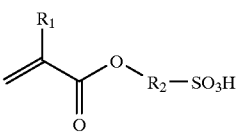

$R_1$ = H (acrylate), or $CH_3$ (methacrylate)
$R_2$ = radical of 1–50 carbon

Stryene and its derivates 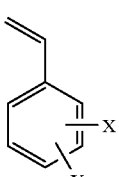

X and Y = H, NH$_2$, SO$_3$H, OCH$_3$ or radical of 1–20 carbon

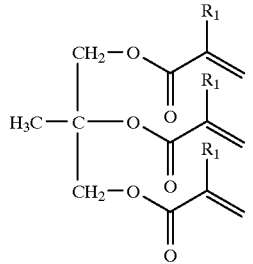

Trimethylolpropane triacrylates and trimethacrylates

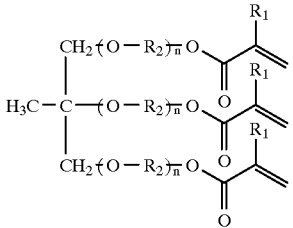

Alkoxylated trimethylolpropane triacrylate and trimethacrylate

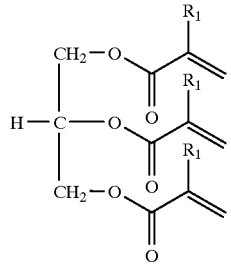

Glyceryl triacrylates and trimethacrylates

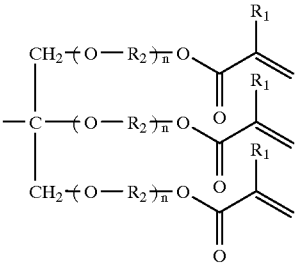

Alkoxylated glyceryl triacrylate and trimethacrylate

R$_1$ = H (acrylate) or CH$_3$ (methacrylate)
R$_2$ = radical of 1–50 carbon
n = 1–50 repeat units

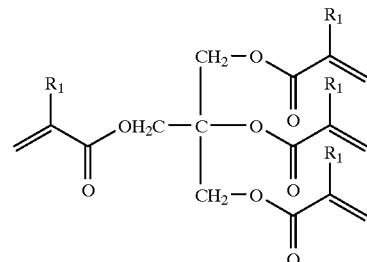

Pentaerythritol tetraacrylate and tetramethacrylate

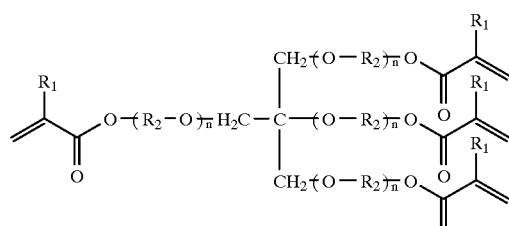

Alkoxylated pentaerythritol tetraacrylate and tetramethacrylate

R$_1$ = H (acrylate) or CH$_3$ (methacrylate)
R$_2$ = 1–50 carbon
n = 1–50 repeat units

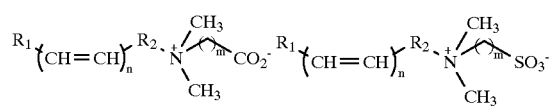

polyunsaturated betaines    polyunsaturated sulfo-betaines

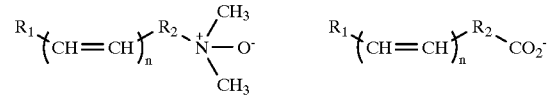

polyunsaturated amine oxides    polyunsaturated fatty acids

R1 and R2 = radical of 1–50 carbon
m and n = 1–10 repeat unit

X, Y = H or —CH=CH$_2$
R = radical of 1–50 carbon
n = 1–100 repeat units polyethylene oxide alkyl alkyenyl phenol Polyalkylene (aryl) glycol diacrylates and dimethacrylates

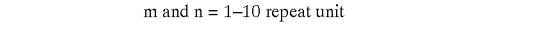

R$_1$ = H (acrylate) or CH$_3$ (methacrylate)
R$_2$ = 1–20 carbon
n = 1–50 repeat units Polyalkylene (aryl) divinyl ethers

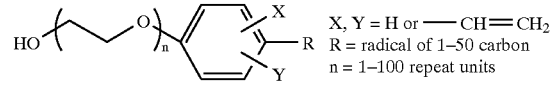

R = 1–20 carbon
n = 1–50 repeat units

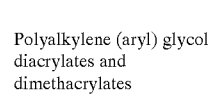

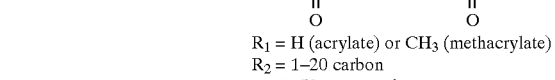

Polyethylene glycol 200 dimethacrylates    Divinyl diethylene glycol diether

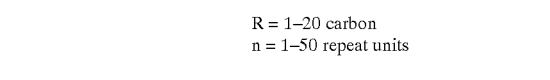

Acrylic acid, Na$^+$ and K$^+$ salt    Methacrylic acid, Na$^+$ and K$^+$ salt

2-Ethyl hexyl acrylate    2-Ethyl hexyl methacrylate

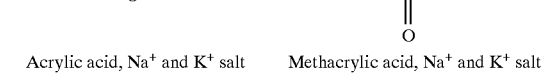

n-Hexyl acrylate    n-Hexyl methacrylate

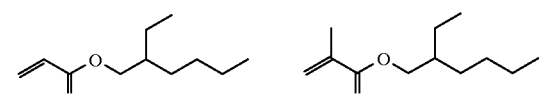

N,N-Dimethylaminoethyl acrylate    N,N-Dimethylaminoethyl methacrylate

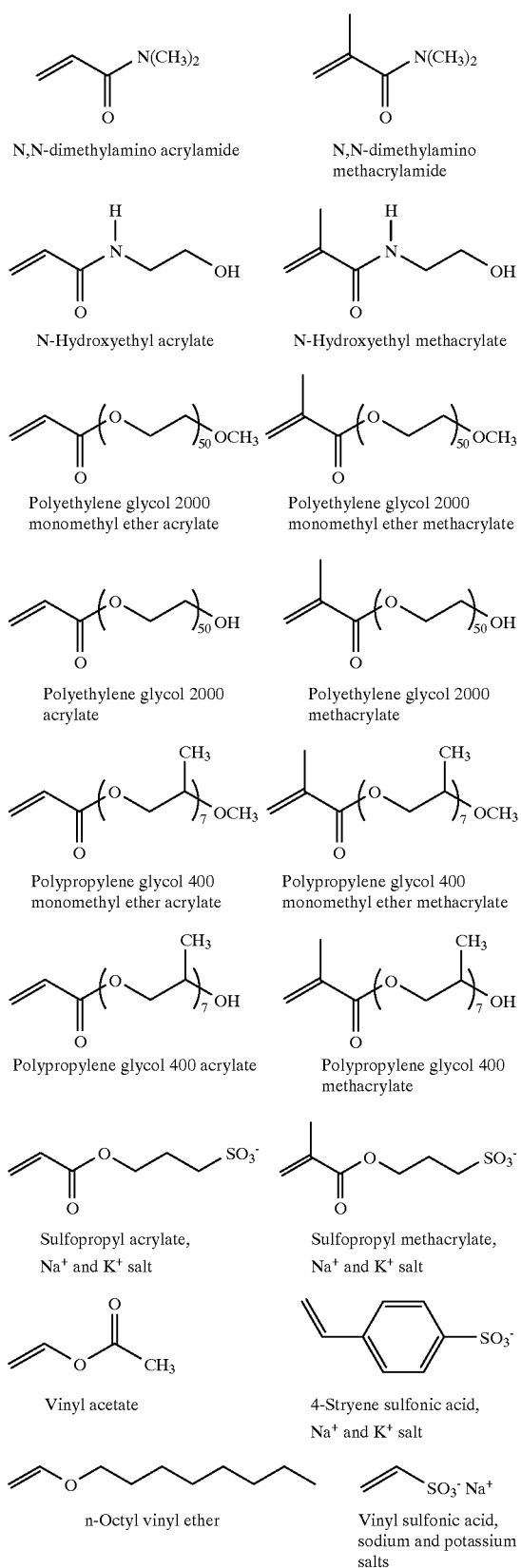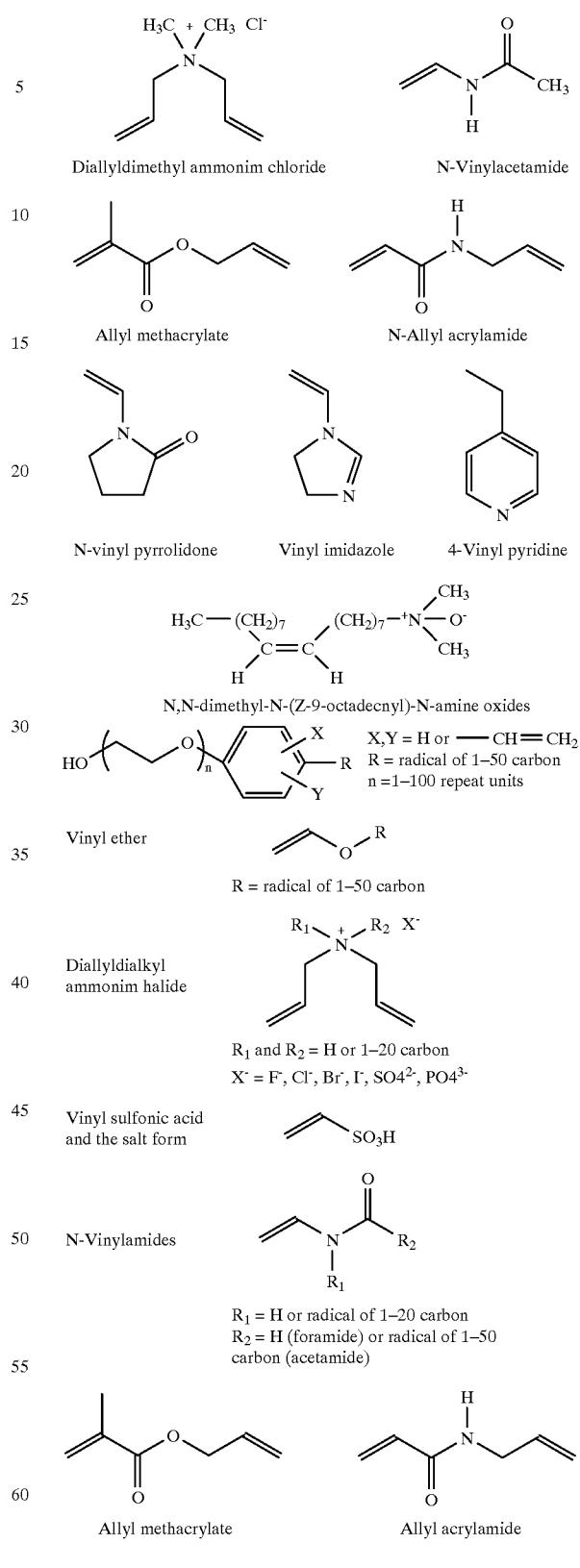

-continued

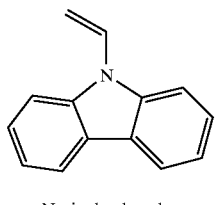
N-vinylcarbazole

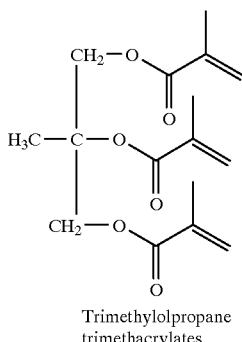
Trimethylolpropane trimethacrylates

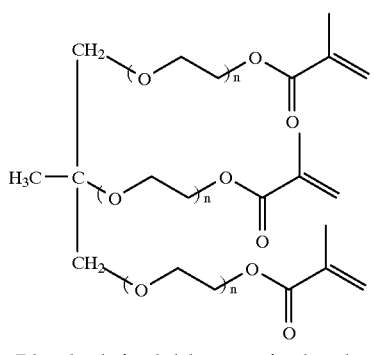
Ethoxylated trimethylolpropane trimethacrylate and mixtures thereof.

11. A method of ink-jet printing according to claim 10 wherein said water-solubilizing functional groups are aromatic groups having attached ionizable groups selected from the group consisting carboxylate, sulfonate, ammonium, quaternary ammonium, phosphonium, and mixtures thereof.

12. A method of ink-jet printing according to claim 10 wherein said water-soluble functional groups and said polyolefinic groups comprise from about 0.001 mmol/g to about 10 mmol/g of said macromolecular chromophore.

13. A method of ink-jet printing according to claim 10 wherein said polyolefinic group is selected from the group consisting of vinyl, acrylate, methacrylate, acrylamide, methacrylamide, and mixture thereof.

14. A method of ink-jet printing according to claim 10 comprising printing on a medium an ink composition comprising:
   a) from about 0.001% to about 10 wt % of said macromolecular chromophore;
   b) from about 0.01% to about 50 wt % of one or more cosolvents;
   c) from 0% to about 40 wt % of one or more water-soluble surfactants/amphiphiles; and
   d) from 0% to about 3 wt % of one or more high molecular weight colloid.

15. A method according to claim 14 wherein said water-solubilizing functional groups are aromatic groups having attached ionizable groups selected from the group consisting carboxylate, sulfonate, ammonium, quaternary ammonium, phosphonium, and mixtures thereof.

16. A method according to claim 14 wherein said water-soluble functional groups and said polyolefinic groups comprise from about 0.001 mmol/g to about 10 mmol/g of said macromolecular chromophore.

17. A method according to claim 14 wherein said polyolefinic group is selected from the group consisting vinyl, acrylate, methacrylate, acrylamide, methacrylamide, and mixture thereof.

18. A method according to claim 14 wherein said ink composition has a pH of from about 8 to about 10.

* * * * *